US010496891B2

(12) United States Patent
Sai

(10) Patent No.: US 10,496,891 B2
(45) Date of Patent: Dec. 3, 2019

(54) DRIVER ASSISTANCE SYSTEM AND METHOD FOR OBJECT DETECTION AND NOTIFICATION

(71) Applicant: Harman International Industries, Incorporated, Stamford, CT (US)

(72) Inventor: Srinivas Sai, Bangalore (IN)

(73) Assignee: Harman International Industries, Incorporated, Stamford, CT (US)

(*) Notice: Subject to any disclaimer, the term of this patent is extended or adjusted under 35 U.S.C. 154(b) by 0 days.

(21) Appl. No.: 15/680,046

(22) Filed: Aug. 17, 2017

(65) Prior Publication Data
US 2019/0057262 A1 Feb. 21, 2019

(51) Int. Cl.
G06K 9/00 (2006.01)
G08G 1/16 (2006.01)
B60R 1/00 (2006.01)
G06K 9/62 (2006.01)
(Continued)

(52) U.S. Cl.
CPC ........ *G06K 9/00805* (2013.01); *B60R 1/00* (2013.01); *G06K 9/4661* (2013.01); *G06K 9/6256* (2013.01); *G08G 1/16* (2013.01); *B60R 2300/307* (2013.01); *B60R 2300/804* (2013.01); *B60R 2300/8093* (2013.01); *G06K 9/00798* (2013.01); *G06K 9/2018* (2013.01); *G06K 9/4604* (2013.01)

(58) Field of Classification Search
CPC ........ G06K 9/00798; G06K 9/00805; G06K 9/2018; G06K 9/4604; G06K 9/4661; G06K 9/6256; B60R 1/00; B60R 2300/307; B60R 2300/804; B60R 2300/8093; G08G 1/16
See application file for complete search history.

(56) References Cited

U.S. PATENT DOCUMENTS

2017/0270375 A1* 9/2017 Grauer .................. G01S 17/107

FOREIGN PATENT DOCUMENTS

WO WO-2016092537 A1 * 6/2016 ........... G01S 17/107

OTHER PUBLICATIONS

Davis et al. "Background-subtraction using contour-based fusion of thermal and visible imagery." Computer vision and image understanding 106.2-3 (2007): 162-182. (Year: 2007).*

(Continued)

*Primary Examiner* — Katrina R Fujita
(74) *Attorney, Agent, or Firm* — Gordon & Rees LLP

(57) ABSTRACT

The present disclosure relates to systems, devices and methods for object detection and notification by a driver assistance system of a vehicle. In one embodiment, a method includes receiving image data detected and detecting at least one object in the image data. The method may include detecting objects by performing a feature extraction operation on the image data to identify one or more image areas, and performing a second extraction operation on the image data to identify one or more image areas based on modeled thermal feature training. The method may also include identifying objects in the image data based on a comparison of one or more image areas of the feature extraction operation and second extraction operation. The method may also include outputting a display of the image data detected by the image sensor including one or more graphical elements as a notification for detected objects.

20 Claims, 6 Drawing Sheets

(51) Int. Cl.
*G06K 9/46* (2006.01)
*G06K 9/20* (2006.01)

(56) References Cited

OTHER PUBLICATIONS

Gaszczak et al. "Real-time people and vehicle detection from UAV imagery." Intelligent Robots and Computer Vision XCVIII: Algorithms and Techniques. vol. 7878. International Society for Optics and Photonics, 2011. (Year: 2011).*

* cited by examiner

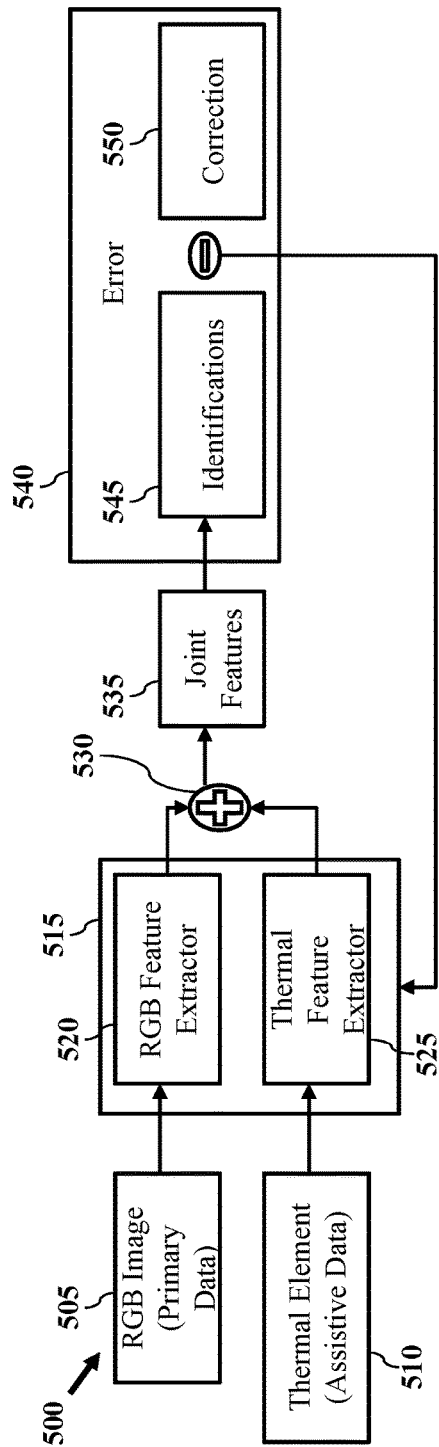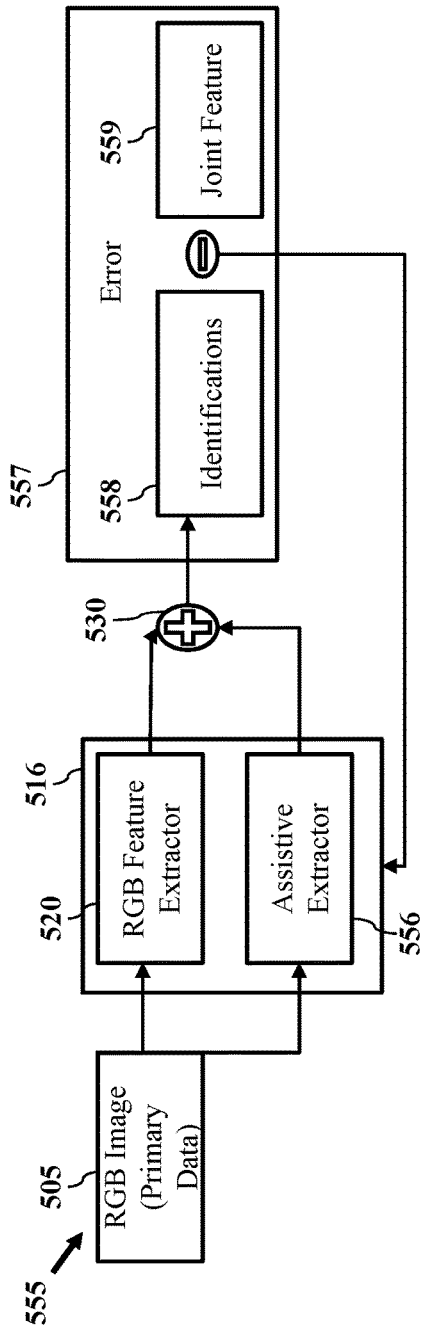
FIG. 5A
FIG. 5B

DRIVER ASSISTANCE SYSTEM AND METHOD FOR OBJECT DETECTION AND NOTIFICATION

FIELD

The present disclosure relates to electronic devices and applications, and more particularly to processes and configurations for detecting objects and presenting notifications by a vehicle driver assistance system.

BACKGROUND

Safe operation of a vehicle is a primary concern for many vehicle operators. As such, technical developments have been directed to systems focused on accident prevention and safe operation. Advances in technology have led to assistance systems that provide alerts. Optical imaging devices (e.g., cameras, etc.) and conventional driver assist systems may not provide adequate information to a user due to lighting conditions, weather and other environmental features. In addition, although different types of sensors may be employed in conventional applications, such as thermal imaging, these systems and sensing devices are either too expensive or limited in their operation. Thermal sensors may not be able to detect objects which do not have a thermal gradient compared to their surrounding and may not provide an adequate ability to detect objects. There is a desire for improved operation of vehicle detection systems. There also exists a desire for driver assist systems that overcome one or more limitations of conventional systems.

BRIEF SUMMARY OF THE EMBODIMENTS

Disclosed and claimed herein are methods, devices and systems for object detection and notification by a driver assistance system. One embodiment is directed to a method including receiving, by a module of a vehicle driver assistance unit, image data detected by an image sensor mounted to a vehicle. The method also includes detecting, by the module of the vehicle driver assistance unit, at least one object in the image data. Detecting the at least one object includes performing a feature extraction operation on the image data detected by the image sensor to identify one or more image areas, performing a second extraction operation on the image data detected by the image sensor to identify one or more image areas based on modeled thermal feature training, and identifying one or more objects in the image data based on a comparison of one or more image areas of the feature extraction operation and second extraction operation. The method also includes outputting, by the module of the vehicle driver assistance unit, display the image data detected by the image sensor including one or more graphical elements to identify the at least one object.

In one embodiment, image data received by the module is captured by an optical image sensor configured to output color model based representation of video image data.

In one embodiment, detecting at least one object includes detection of one or more of a person, pedestrian, vehicle, roadway, lane marker, hazard and objects in front of the vehicle.

In one embodiment, the feature extraction operation includes processing received image data based on one or more of image enhancement, edge detection, filtering and region analysis to identify the one or more objects.

In one embodiment, the second extraction operation to identify one or more image areas based on modeled thermal feature training includes comparison of received image data to thermal model references learned by the module, wherein each thermal reference relates to one or more of a modeled representation of an object, object portion and thermal characteristic.

In one embodiment, identifying one or more objects in the image data includes modifying regions identified by the feature extraction operation based on determinations of the second extraction operation, and tracking one or more features in the image data based on the modified regions.

In one embodiment, identifying one or more objects includes detecting artifacts in the image data associated with thermal characteristics in the image data.

In one embodiment, identifying includes conversion of received image data to a binary gradient for performing at least one of the feature extraction and second feature extraction.

In one embodiment, outputting includes generating one or more of bounding regions and icon elements associated with identified objects detected in the image data.

In one embodiment, the method also includes receiving thermal characteristic models for a plurality of object types and utilizing the thermal characterize models for the second parameter extraction parameters, wherein the thermal characteristic models provide one or more search targets for identification of objects in image data.

Another embodiment is directed to a vehicle driver assist module including an image sensor to detect image data, and an object detection module coupled to the image sensor. The object detection module includes a processor configured to receive image data detected by the image sensor and detect at least one object in the image data. The processor is configured to detect the at least one object including perform a feature extraction operation on the image data detected by the image sensor to identify one or more image areas, perform a second extraction operation on the image data detected by the image sensor to identify one or more image areas based on modeled thermal feature training, and identify one or more objects in the image data based on a comparison of one or more image areas of the feature extraction operation and second extraction operation. The processor is also configured to output the image data detected by the image sensor including one or more graphical elements to identify at least one object.

Other aspects, features, and techniques will be apparent to one skilled in the relevant art in view of the following detailed description of the embodiments.

BRIEF DESCRIPTION OF THE DRAWINGS

The features, objects, and advantages of the present disclosure will become more apparent from the detailed description set forth below when taken in conjunction with the drawings in which like reference characters identify correspondingly throughout and wherein:

FIGS. 5A-5B depict flow diagrams for training procedures for object detection and notification according to one or more other embodiments;

DETAILED DESCRIPTION OF THE EXEMPLARY EMBODIMENTS

Overview and Terminology

Figure 1:
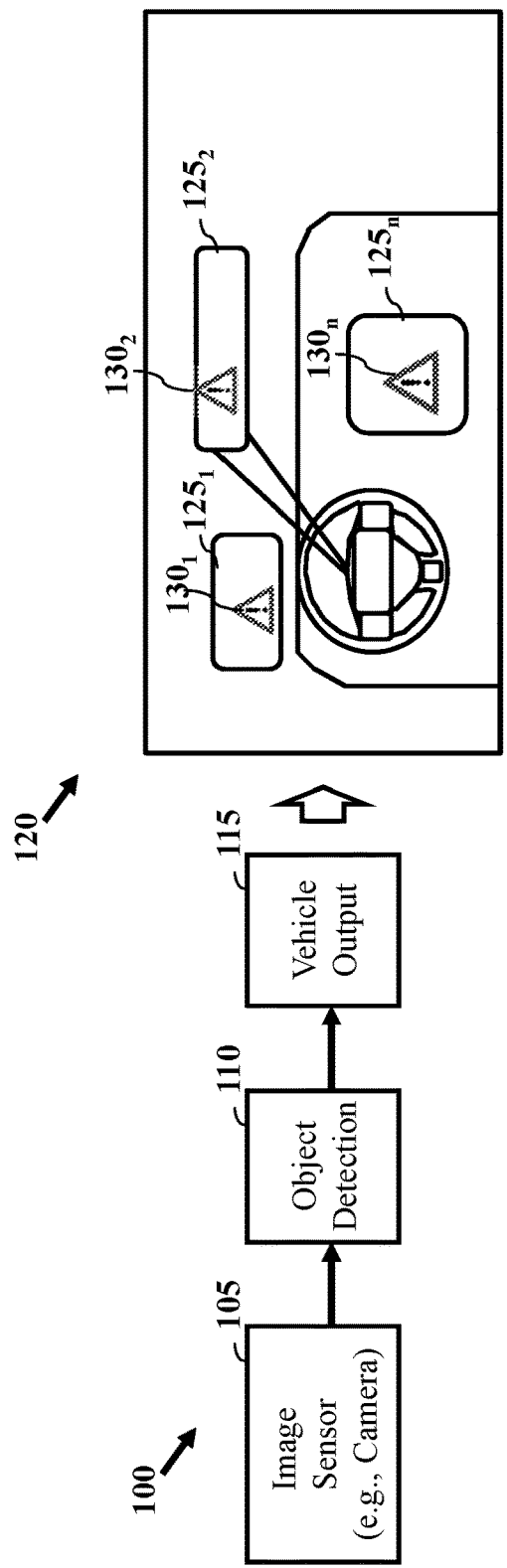
FIG. 1 depicts a graphical representation of object detection and notification by a driver assistance system of a vehicle according to one or more embodiments.

One aspect of the disclosure is directed to a vehicle system to acquire data for a surrounding environment. In one embodiment, a system is configured to detect objects using an image sensor (e.g., camera) without the necessity of high costs assistive data devices such as thermal cameras. The system includes an imaging device, objection detection and notification module, and a vehicle output device to provide notifications. The system may be a part of or employed by vehicle assistance system, infotainment system, and vehicle system in general. The system may be configured to identify various objects present in scene and localize them by super-imposing a bounding box, or other graphical element, over each detected object.

In one embodiment, a process is provided for object detection and notification. The process may include performing a feature extraction operation on the image data detected by the image sensor to identify one or more image areas, performing a second extraction operation on the image data to identify one or more image areas based on modeled thermal feature training, and identifying one or more objects in the image data based on a comparison of the feature extraction and second extraction operations. The process also includes outputting one or more notifications either with or separately from detected image data. Processes described herein may be applied to optical image devices (e.g., digital cameras, etc.) for detecting image and video content. The processes may provide an ordered series of functions performed by vehicle hardware to enhance detection and improve operation of a vehicle assist system and devices. Processes described herein may be directed to low visibility conditions as a result of one or more of low-light, directed light (e.g., high beams, etc.), glare and weather conditions (e.g., haze, fog, high temperature, etc.). Processes described herein may be employed by device and system configurations and can include the use of training and learning algorithms for object detection.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

Exemplary Embodiments

Referring now to the figures, FIG. 1 depicts a graphical representation of object detection and notification by a driver assistance system of a vehicle according to one or more embodiments. System 100 of FIG. 1 is a driver assist system for a vehicle. According to one embodiment, system 100 is configured to detect objects based on image data captured by an imaging sensor, such as a camera, mounted to a vehicle. System 100 is configured to provide notifications based on detected objects. System 100 may be an intelligent system for a vehicle that acquires data about a surrounding environment through various sensors and processes the data using pre-trained algorithms to take decisions at required tasks. System 100 provides a method for designing efficient scene understanding systems for low-lighting conditions without the necessity of the high-cost thermal cameras (assistive data) during the deployment phase. System 100 can compensate for the lack of assistive data during the deployment phase by training a learning algorithm in which parameters are tuned to achieve the best possible object detection. In one embodiment, system 100 may be trained using both primary and assistive data for object detection. During deployment, system 100 may be only provided primary data for training the algorithm and assign it a task of mimicking the features predicted by the model in the first phase. This encourages the algorithm to extract patterns learned by the model in the first phase even when it is limited to primary data.

According to one embodiment, system 100 includes image sensor 105, object detection module 110 and vehicle output 115. FIG. 1 also depicts an exemplary representation of driver assist system output 120. Output 120 may include one or more notifications of detected objects. As will be discussed below, output notifications may be presented by one or more display and/or output elements of a vehicle.

According to one embodiment, image sensor 105 relates to an image sensor mounted to a vehicle to detect objects. In one embodiment, image sensor 105 is a camera configured to detect and output image data, such as video data. In one embodiment, image sensor 105 relates to an optical sensor. Image sensor 105 outputs detected image data to object detection module 110. Image sensor 105 may relate to a photoelectric sensor generating color image output using sensor areas that detect red (R), green (G) and blue (B) components (RGB). Image sensor 105 outputs may be one of a single chip or multiple chip configuration to detect each color component.

In one embodiment, image sensor 105 may be mounted on the front of the vehicle to detect objects associated with the vehicle's main direction of travel. As such, image sensor 105 may captures video image data outside of a vehicle, such as in a front area of a vehicle associated with a roadway. Object detection module 110 is configured to receive detected image data and detect one or more objects by processing the captured image data. Object detection module 110 is also configured to output image output for display in the vehicle to a vehicle output 115 such that the display output may include one or more notifications. According to one embodiment, image sensor 105 relates to a digital camera configured to optically detect and capture image data. Exemplary frame detection rates of image sensor 105 may be one or more frame detection rates, including but not limited to 60 Hz, 120 Hz, 240 Hz, etc.

According to one embodiment, object detection module 110 is configured detect objects based on one or more feature extractions. According to one embodiment, object detection module 110 may modeled thermal feature training for detection of objects in image data captured by an optical image sensor (e.g., without the use of a thermal imaging device). According to another embodiment, object detection module 110 may compare image areas from the feature extractions to identify objects either not detectable or difficult to detect in image data alone. Image enhancement module 110 may also be configured to present graphical elements to indicate detected objects to an operator of the vehicle.

As discussed herein, objects may relate to fixed and non-fixed (e.g., moving, non-permanent, etc.) objects. Thermal attributes of objects may be stored by system 100 and utilized to identify objects using optical image data. According to one embodiment, object detection module 110 may be configured for operation under one or more of low-light, directed light (e.g., high beams, etc.), glare and weather conditions (e.g., haze, fog, high temperature, etc.). Object detection module 110 may be configured to detect objects and present graphical elements to indicate detected objects to an operator of the vehicle.

Object detection module 110 may be pre-trained as described below in FIGS. 5A-5B to extracting both RGB features and pseudo-thermal features using the video captured from RGB sensors alone. Joint features produced by system 100 are used to detect various objects present in the view-field of the driver.

According to one embodiment, vehicle output 115 relates to one or more of a display, audible output, projection and output in general to notify an operator of a vehicle of a detected object. As shown in FIG. 1, output 120 relates to a graphical representation of displays $125_{1-n}$ and notifications $130_{1-n}$. Output 120 may be presented on one or more displays, such as a heads-up display $125_1$, instrument display $125_2$, and media console display $125_n$. Each display may be configured to present a notification which may relate to a graphical element such as an icon, warning light, bounding display(s), etc. Displays $125_{1-n}$ may be part of a vehicle infotainment system to present one or more of image data, object indicators and representations of a scene detected by image sensor 105.

In one embodiment, vehicle output 115 presents visual/auditory notifications to a driver using an infotainment system of the vehicle. In an exemplary embodiment, the threshold for issuing notifications can be user-specified or be based on standard practices. An example of notifications could be a pedestrian in the periphery of driver's vision who is about to cross the road or a stray animal.

Figure 2:
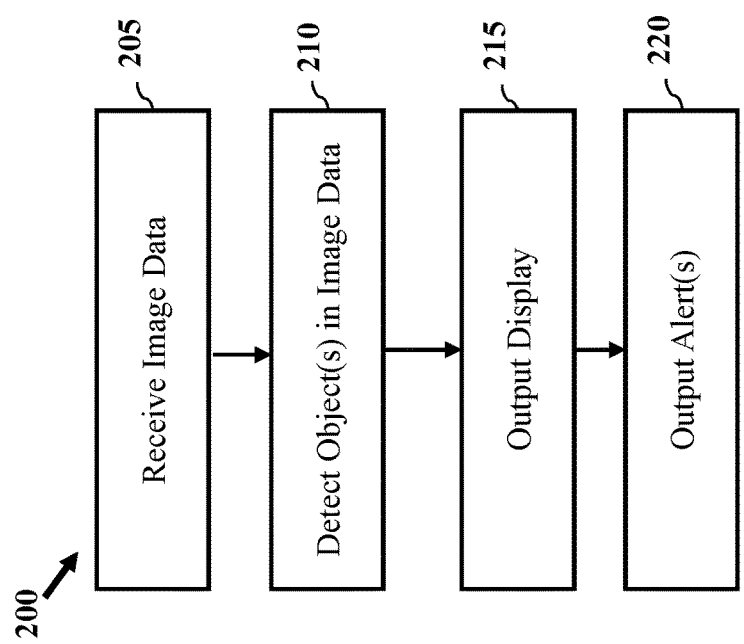
FIG. 2 depicts a process for object detection and notification by a driver assistance system of a vehicle according to one or more embodiments.

FIG. 2 depicts a process for object detection and notification by a driver assistance system of a vehicle according to one or more embodiments. Process 200 may be employed by a device, such as an object detection module (e.g., object detection module 110) of a vehicle driver assist system (e.g., system 100) and one or more other components to detect objects and output image data and notifications. According to one embodiment, process 200 may be initiated by the object detection module of the driver assist system receiving image data representing an outside of a vehicle at block 205. Image data received at block 205 may relate to video data captured by a front facing camera of the vehicle.

In one embodiment, image data received by the module at block 205 is captured by an optical image sensor configured to output color model based representation of video image data. The object detection module may select frames or utilize all frames of received image data for detection of objects. Process 200 may be directed to a single frame or combination of frames to detect objects. In some embodiments, multiple frames of image data received at block 205 may be processed concurrently for detection objects and/or output by the device.

At block 210, the object detection module detects at least one object in the image data. In one embodiment, detecting the at least one object includes performing a feature extraction operation on the image data detected by the image sensor to identify one or more image areas, and performing a second extraction operation on the image data detected by the image sensor to identify one or more image areas based on modeled thermal feature training. The object detection module identifies one or more objects in the image data based on a comparison of one or more image areas of the feature extraction operation and second extraction operation. One way of performing feature extraction from the image at block 210 can include using a variant of neural network, such as one or more of a feed-forward neural network, convolutional neural network, and recurrent neural network.

In one embodiment, detecting an object at block 210 includes detection of one or more of a person, pedestrian, vehicle, roadway, lane marker, hazard and objects in front of the vehicle. Process 200 examines objects on the surface of travel (e.g., potholes, obstacles, debris, etc.) and in the direction of travel. To detect objects, image data may be corrected or processed. In addition, one or more extractions or modifications may be performed in parallel by a processor of the module. In one embodiment, one or more operations may be performed on received image data, such as a feature extraction operation is performed at block 210. The feature extraction operation can includes processing received image data based on one or more of image enhancement, edge detection, filtering and region analysis to identify the one or more objects. Image enhancement may include improvement of the pixel data, removal of artifacts, corrections (e.g., light correction, glare removal, error removal, etc.). In one embodiment, edge detection relates to detection of objects by detecting the edge of a shape within the image data. One or more frames may be employed to identify a shape through edge detection, the shape may then be tracked or detected through a series of frames. Filtering can include one or more imaging operations to selectively remove or select characteristics of the image data. Region analysis may include comparison of regions in a frame to other regions within the same frame or another frame to detect an object. Edge detection, filtering and/or region analysis may be performed using learned filters of a convolutional neural network or variant of a convolutional neural network.

According to another embodiment, block 210 may include a second extraction operation to identify one or more image areas based on modeled thermal feature training. By way of example, received image data may be compared to thermal model references learned by an object detection module. Areas which match or show a particular degree of similarity may be identified. In certain embodiments, each thermal reference relates to one or more of a modeled representation of an object, object portion and thermal characteristic. By way of example, a modeled representation of pedestrian may include a shape profile for a pedestrian walking towards, away, transverse in either direction (e.g., left to right, and right to left), wherein the model representation may be matched to image data in one or more sizes. Alternatively or in combination, modeled representations relate to characteristics of objects with parameters filtered to a light range or light ranges which improve detection of shapes. Thermal characteristic models for a plurality of object types may be received by the object detection module which can then utilize the thermal characterize models for the second parameter extraction parameters. The thermal characteristic models can provide one or more search targets for identification of objects in image data. In one embodiment, the thermal characteristic models relate to parameters that can be detected in optical image data without the need for thermal detection of the current scene.

In one embodiment, the second feature extraction of block 210 includes identifying one or more objects by detecting artifacts in the image data associated with thermal characteristics in the image data. In one embodiment, a detection module may be trained to identify characteristics of thermal properties in either raw or processed image data. By way of example, a thermal image may identify a silhouette or heat signature in the infra red (e.g., non visible) range. However, these characteristics result in a shape or series of shapes, the shapes or outlines can be compared to detected image data and in particular artifacts in the optical range to identify an object.

In one embodiment, identification of objects in block 210 includes conversion of received image data to a binary gradient for performing at least one of the feature extraction and second feature extraction. Image data received at block 205 may be processed or modified using one or more contrast levels, or inversion types, wherein objects are detected by analysis of converted image data. By conversion to a binary gradient, the object detection module may generate an image with varying light intensities that allow for detection of an object. In one example of a binary gradient, white pixels are inverted to become black, and black pixels of the frame are inverted to become white, etc. According to one embodiment, image data is inverted to better detect dark objects or surfaces. Other operations may include dehazing based on scene radiance. Detection at block 210 can also include modifying regions identified by the feature extraction operation based on determinations of the second extraction operation, and tracking one or more features in the image data based on the modified regions to identify one or more objects in the image data includes.

Detection at block 210 for either the feature extraction or second extraction may employ one or more forms of image processing to detect an object. Block 210 may include performing one or more of an opening or closing operation. Opening can include the dilation of pixel elements to remove objects from the foreground. Opening can be used to find specific shapes or elements that match a certain fit or corner. Detection at block 210 may also employ closing to remove small holes. Opening and closing may both be used to remove noise from detected image data.

In one embodiment, detection at block 210 may include application of edge detection to image pixels. Edge detection may include reading pixels of image data, detection of a cell/shape, dilation of the cell/shape, smoothing the shape and drawing an outline. One or more of image equalization, binary gradients, pixel grouping and frame by frame analysis may also be used to detect objects.

At block 215, the vehicle driver assist system outputs a display. In one embodiment, the display at block 215 includes image data received at block 205. By way of example, the received image data from a front face camera may be displayed on a vehicle display.

At block 220, the vehicle driver assist system outputs one or more alerts or notifications. Block 220 can include outputting for display the image data detected by the image sensor including one or more graphical elements to identify the at least one object. In one embodiment, outputting includes generating one or more of bounding regions and icon elements associated with identified objects detected in the image data. Output at blocks 215 and 220 allow for displaying the image data detected by the image sensor including one or more graphical elements to identify detected objects.

Figure 3:
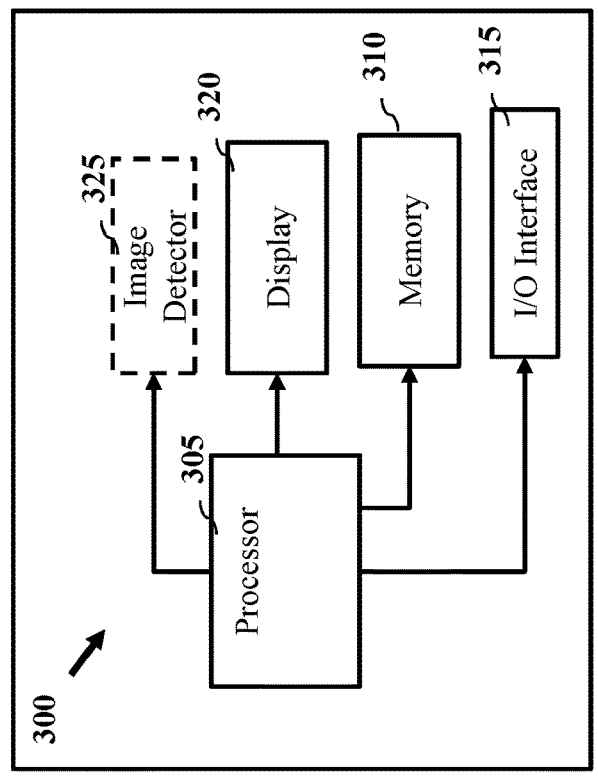
FIG. 3 depicts a diagram of a vehicle unit according to one or more embodiments.

FIG. 3 depicts a diagram of a vehicle unit according to one or more embodiments. Vehicle unit 300 includes processor 305, memory 310, and input/output interface 315. In some embodiments, vehicle unit 300 may optionally include image detector 325. Vehicle unit 300 may be configured to receive, and/or capture image data, and detect one or more objects in the image data.

Processor 305 may be configured to provide one or more driver assistance functions, including controlling presentation and notifications for a vehicle driver assistance unit. According to one embodiment, processor 305 is configured to perform one or more operations, such as the operations to output object detection notifications. Memory 310 may include ROM and RAM memory for operation of vehicle unit 300 and processor 305. Input/output interface 315 may include one or more inputs or controls for operation of vehicle unit 300. Display 320 may relate to a vehicle display for presentation of detected image data and one or more graphical elements or notifications. Display 320 may present a control interface for vehicle unit 300.

Optional image detector 325 may represent a vehicle image sensor that may be part of vehicle unit 305. In certain embodiments vehicle unit 300 may interface with an image sensor separate from the vehicle unit. In other embodiments, vehicle unit 300 may include an optional image detector 325.

Figure 4:
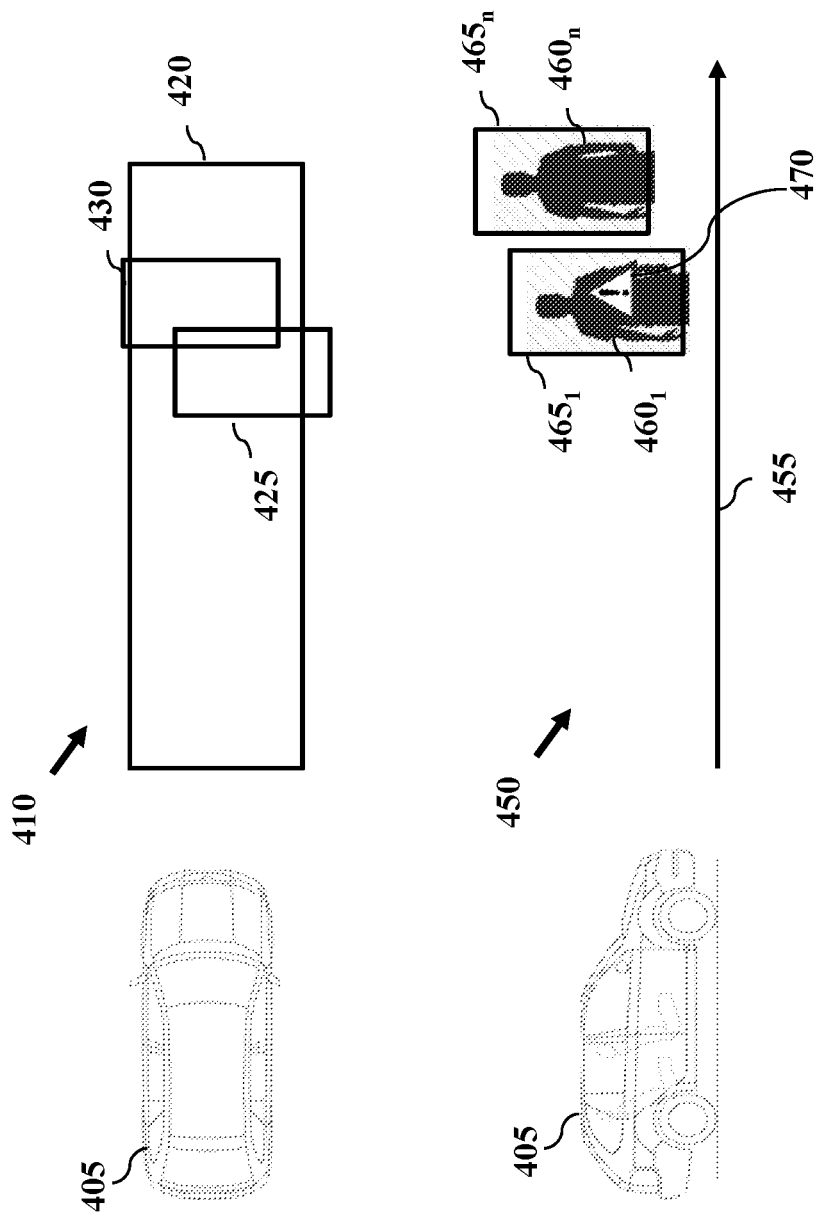
FIG. 4 depicts graphical representation of object detection and notification according to one or more embodiments.

FIG. 4 depicts graphical representation of object detection and notification according to one or more embodiments. FIG. 4 depicts an elevated view of vehicle 405 from above and a detection area 410 from above. FIG. 4 also depicts a side view of vehicle 405 with the detection area shown from the side, generally referred to as 450. According to one embodiment, vehicle 405 includes an image sensor, such as a camera, mounted to the vehicle. The image sensor is configured to detect image data associated with an area 420 in front or vehicle 405. In one embodiment, area 420 relates to a ground surface in front of vehicle 405, such as section of a roadway. An image sensor of vehicle 405 captures image data of area 420, which is utilized to detect one or more objects, such as a pothole, speed bump, or object in general (e.g., roadway debris, etc.) in area 420. According to one embodiment, detected objects may be associated with a particular area of each frame in the image data, shown as areas 425 and 430. As a vehicle moves closer to the detected object, the position of areas 425 and 430 within area 420 will move closer to vehicle 405. According to one embodiment, one or more notifications presented by vehicle 405 can indicate the presence of objects in areas 425 and 430.

According to one embodiment, an object detection module can detect elements of a driving surface and objects on the driving surface. The objection detection module can account for different types of surfaces. Although shown as rectangular area 420, other shapes or detection parameters may be employed, such as detection areas for curved roads.

Referring to the side view of vehicle 405 and area 450, image data is also detected of objects within a path 455 of the vehicle, such as a range from 0-100 ft (0-30 m). The image sensor of vehicle 405 captures image data of area 450, which is utilized to detect one or more objects, such as pedestrians $460_{1-n}$ in area 450. According to one embodiment, detected objects may be associated with a particular area of each frame in the image data, shown as areas $465_{1-n}$ for pedestrians $460_{1-n}$. As a vehicle moves closer to the detected object, the position of areas $465_{1-n}$ within area 450 will move closer to vehicle 405. According to one embodiment, one or more notifications, such as notification 470, presented by vehicle 405 can indicate the presence of objects in areas $460_{1-n}$.

One or more notifications presented by vehicle 405 can indicate the presence of objects in areas 425, 430 and 450 relating to one or more of a person, pedestrian, vehicle, roadway, lane marker, hazard and objects in front of the vehicle. In FIG. 4, rectangular shapes used to depict objects, however, it should be appreciated that one or more of shading, coloring, highlighting, and display of graphical images may be employed as notifications.

Figure 5C:
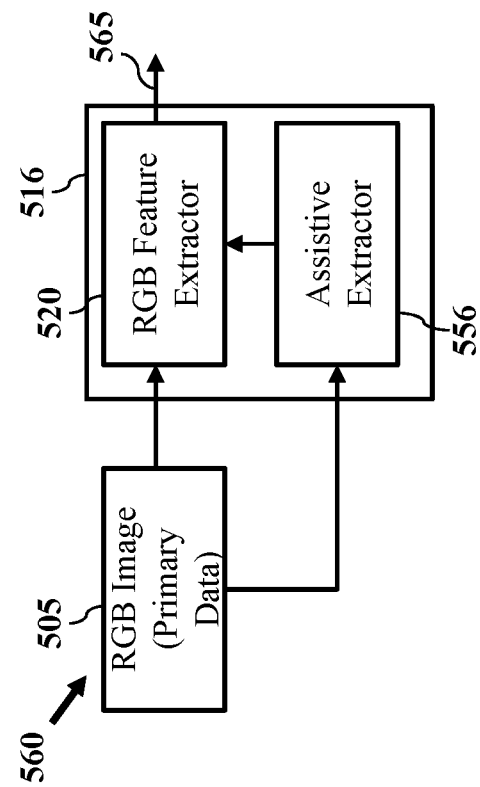
FIG. 5C depicts a flow diagram for object detection and notification according to one or more other embodiments.

FIGS. 5A-5C depict flow diagrams for object detection and notification according to one or more other embodiments. According to one embodiment, processes in FIGS. 5A-5B describe one or more mechanisms for understanding scene information of detected image data. According to one embodiment, process 500 of FIG. 5A provides a learning phase for training a vehicle assistance system to perform object detection. According to another embodiment process 555 of FIG. 5B provides a process to train detection of objects without the use of an assistive sensor (e.g., thermal detection, non-optical sensors of a vehicles environment, etc.).

Referring first to FIG. 5A, process 500 relates to a training phase. According to one embodiment, process 500 is not used by a vehicle assistance unit during operation of a vehicle. Rather, process 500 may be employed to configure device operation for later use with only optical image data as input. Process 500 includes receiving RGB image data 505 (e.g., primary data) and Thermal element data 510 (e.g., assistive data) by feature extraction module 515. According to one embodiment, image data 505 and thermal element data 510 relate to an optical image (or data) and a thermal image (or data) for the same scene.

Feature extraction module 515 includes RGB feature extractor 520 to receive RGB image data 505 and thermal feature extractor 525 to receive thermal element data 510. RGB feature extractor 520 identifies one or more elements and regions of interest. Similarly, thermal feature extractor 525 identifies one or more regions of interest based on the detected thermal data. Identified regions are combined by combiner 530 and joint features (e.g., RGB and thermal) are identified at block 535. In an exemplary embodiment, RGB feature extractor may identify one or more areas of interest in a frame or series of frames based on feature extraction. The feature extraction may be based on processed of modified image data, wherein the image data is corrected, inverted, or includes one more of color and pixel processing or filtering. Thermal feature extractor 525 performs a thermal feature extraction looking at thermally detected data for one or more frames of thermal data associated with the same time of detection as the optical frames. As a result two sources of data are generated for the same scene during the same time period. Combiner 530 provides the two sets of data to joint features module 535 which matches areas of interest from the two sets of data based on the location of elements within a frame.

According to one embodiment, module 540 receives joint features 535 and trains the system to use features from both detected image data (e.g., RGB feature extractor) and data from thermal feature extractor. Positive or matching feature identifications are identified and learned by Identifications module 545. According to another embodiment, module 540 receives joint features 535 and modifies the parameters employed by RGB feature extractor, such as thermal modeled parameters. Correction module 550 is configured to provide feature extraction module 515 with updates to modify the parameters of RGB feature extractor 520 when for areas of objects identified by RGB feature extractor 520 which are incorrectly identified.

In certain embodiments, several scenarios may be modeled with process 500 to generate thermal modeling parameters including identification of a pedestrian at one or more distances, identification of objects in a roadway, identification of other vehicles, etc. Process 500 of FIG. 5A allows for one or more parameters to be employed by feature extraction module 515 and RGB feature extractor 520 for object identification.

In one exemplary scenario of pedestrian detection in a low-light environment, both RGB and thermal camera output for a scene may be utilized. The representations of a pedestrian in both the images differ with respect to color, texture, etc. However, the basic features like shape, and contours will remain consistent. Thermal camera output used in low light conditions can capture an objects heat signature and can provide visibility as to one or more of an objects shape, contours, image intensity, etc. According to one embodiment, feature extraction module 515 can be trained to produce thermal like output from a corresponding RGB image, and thus, eliminate the need for a thermal camera. Feature extraction module 515 can also alert users about objects like pedestrian/cyclists/etc that are marginally visible in a low light scene.

Referring now to FIG. 5B, process 555 describes a training procedure for an object detection module. Process 555 includes receiving RGB image data 505 (e.g., primary data). Received image data may relate to image data captured from a front facing view from a vehicle. Feature extraction module 516 includes RGB feature extractor 520 and assistive extractor 556 to receive RGB image data 505. According to one embodiment, RGB feature extractor 520 identifies one or more elements and regions of interest in received image data 505. In one embodiment, RGB feature extractor 520 performs a first feature extraction. Similarly, assistive extractor 556 identifies one or more regions of interest based on the detected image data. Assistive extractor 556 performs a second extraction based on modeled thermal parameters. Identified regions are combined by combiner 530 and module 557 detects one of more objects using image data and one or more modeled thermal parameters. In module 557, one or more objects are detected at block 558 based on joint features at block 559. Errors between identified objects are provided to feature extraction module 516 for incorrectly identified objects. In an exemplary embodiment, RGB feature extractor may identify one or more areas of interest in a frame or series of frames based on feature extraction. The feature extraction may be based on processed of modified image data, wherein the image data is corrected, inverted, or includes one more of color and pixel processing or filtering.

According to another embodiment, module 557 may employ one or more learning algorithms to identify objects of interest and enhance object detection. In one embodiment, object identification enhances objects of interest based on frame comparison. Once an object is identified, further deep learning algorithms are used for enhancing the object of interest. The object and/or graphical elements may then be superimposed on the original image data. Object enhancement may include prior knowledge of static objects (road signs, potholes, etc.) from available images or other data available to module 557.

According to one embodiment, process 555 may perform a second phase of training to compensate for the lack of a assistive data by guiding a learning algorithm to extract patterns from primary data similar to those extracted from primary+assistive data in process 500. As illustrated process 500, the RGB and thermal features extractors are trained to produce features useful for object detection task from their corresponding data. These extractors are trained by comparing their predictions with the ground-truth annotation (accurately marked manual annotation for the task) and correcting for the error. In process 555, the thermal feature extractor is replaced with a pseudo-thermal feature extractor and is trained to mimic the features produced in process 500. Following process 555, a vehicle system does not require thermal data (assistive data) to identify objects.

An application of the above training approach would be that of object detection in a poorly-lit environment. Here, the primary data is an image captured from the usual RGB camera where as the secondary data is an image captured from the thermal camera. Clues from the thermal camera can assist the algorithm in detecting objects which are barely visible in the RGB image but emit some heat signatures which can be captured in the thermal image. The above approach trains the algorithm to look for patterns in RGB image itself which are indicative of the thermal signature, thereby improving the performance of RGB based object detection algorithm in the low-light environment. Once the system is trained in the above manner, it requires the data only from the RGB sensors during the deployment phase, thereby keeping the overall cost of the object detection system low.

Referring now to FIG. 5C, process 560 describes operation of an object detection module for a vehicle assistance unit during operation of a vehicle. Process 560 includes elements similar to process 555. Process 560 includes receiving RGB image data 505 (e.g., primary data). Received image data may relate to image data captured from a front facing view from a vehicle. Feature extraction module 516 includes RGB feature extractor 520 and assistive extractor 556 to receive RGB image data 505. According to one embodiment, RGB feature extractor 520 identifies one or more elements and regions of interest in received image data 505. In one embodiment, RGB feature extractor 520 performs a first feature extraction. Similarly, assistive extractor 556 identifies one or more regions of interest based on the detected image data. Assistive extractor 556 performs a second extraction based on modeled thermal parameters. According to one embodiment, feature extraction module 516 uses identified regions from RGB feature extractor 520 and assistive extractor 556 to detect one of more objects from received using image data and one or more modeled thermal parameters. In an exemplary embodiment, RGB feature extractor 520 may identify one or more areas of interest in a frame or series of frames based on feature extraction. The feature extraction may be based on processed of modified image data, wherein the image data is corrected, inverted, or includes one more of color and pixel processing or filtering.

According to another embodiment, feature extraction module 516 may employ one or more learning algorithms to identify objects of interest and enhance object detection. In one embodiment, object identification enhances objects of interest based on frame comparison. Once an object is identified, further deep learning algorithms are used for enhancing the object of interest. The object and/or graphical elements may then be superimposed on the original image data. Object enhancement may include prior knowledge of static objects (road signs, potholes, etc.) from available images or other data available to feature extraction module 516.

According to one embodiment, process 560 may extract patterns from primary data similar to those extracted from primary and assistive data in process 555. Detected objects are output as 565 to a vehicle system.

Figures 6, 7:
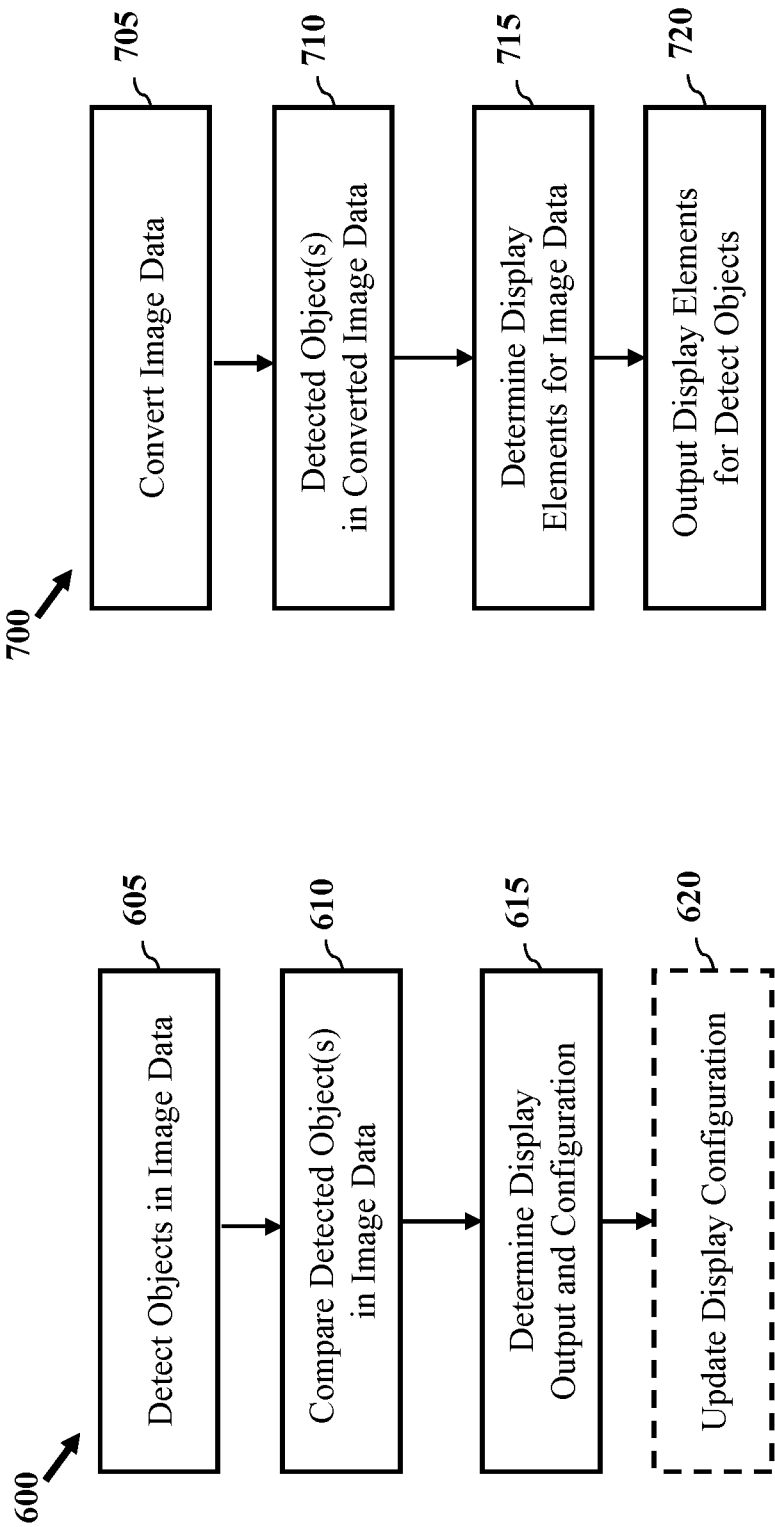
FIG. 6 depicts a process for object detection and notification according to one or more embodiments.
FIG. 7 depicts a process for object detection and notification according to one or more other embodiments.

FIG. 6 depicts a process for object detection and notification according to one or more embodiments. Process 600 may be employed by a device, such as an object detection module (e.g., object detection module 110) of a vehicle driver assist system (e.g., system 100), and one or more other components to detect objects and determine display configurations. According to one embodiment, process 600 may be initiated by the object detection module of the driver assist system detecting objects in image data at block 605. Object detection at block 605 may be based on analysis of image data, using one or more frames to identify and classify objects.

At block 610, process 600 comparing detected objects to one or more thermal modeling parameters stored for by the object detection module. In one embodiment, the object detection module includes a stored listing of a plurality of thermal characteristics that may be detected in captured image data. Process 610 may compare one or more of detected objects, identified regions, and image data as a whole to one or more stored parameters.

At block 615, display output and display configurations are determined for one or more determined objects. According to one embodiment, one or more types of notifications can be presented to notify a detected object. When several objects are detected, several notices may be provided in parallel with each notification formatted based on the object.

Process 600 may optionally include updating display configuration at block 620. Updates may be based on change of vehicle position. For example, abounding box may have to change position in display. This could include moving the position of bounding box or icon, and changing display attributes to display element, such as increasing the size of the bounded box.

FIG. 7 depicts a process for object detection and notification according to one or more other embodiments. Process 700 may be employed by a device, such as an object detection module (e.g., object detection module 110) of a vehicle driver assist system (e.g., system 100) and one or more other components to detect objects. According to one embodiment, process 700 may be employed by the object detection module of the driver assist system to allow for detection of objects in image data. Process by may be initiated by converting image data at block 705. By way of example, image data detected by an image sensor (e.g., image sensor 105) may be converted by one or more of inversion, dehazing, opening etc. to allow for greater ability to detect objects. Once converted, objects may be detected in the image data at block 710. Detection of objects in block 710 may include comparison of objects in converted image data based on one or more thermal parameters. At block 715, display elements for image data may be determined. In one embodiment, graphical elements such as a bounding box, or symbol, may be selected for presentation on an output of the vehicle, such as a display. At block 720, display elements may be output as a notification for one or more detected objects.

While this disclosure has been particularly shown and described with references to exemplary embodiments thereof, it will be understood by those skilled in the art that various changes in form and details may be made therein without departing from the scope of the claimed embodiments.

What is claimed is:

1. A method for object detection and notification by a driver assistance system of a vehicle, the method comprising:
    receiving, by a module of a vehicle driver assistance unit, optical image data detected by an optical image sensor mounted to a vehicle;
    detecting, by the module of the vehicle driver assistance unit, at least one object in the optical image data, wherein detecting the at least one object includes
        performing a feature extraction operation on the optical image data detected by the optical image sensor to identify one or more image areas,
        performing a second extraction operation on the optical image data detected by the optical image sensor to identify one or more image areas based on modeled thermal feature training, and
        identifying one or more objects in the optical image data based on a comparison of one or more image areas of the feature extraction operation and second extraction operation; and
    outputting, by the module of the vehicle driver assistance unit, for display the image data detected by the image sensor including one or more graphical elements as a notification for the at least one object.

2. The method of claim 1, wherein image data received by the module is captured by an optical image sensor configured to output color model based representation of video image data.

3. The method of claim 1, wherein detecting at least one object includes detection of one or more of a person, pedestrian, vehicle, roadway, lane marker, hazard and objects in front of the vehicle.

4. The method of claim 1, wherein the feature extraction operation includes processing received image data based on one or more of image enhancement, edge detection, filtering and region analysis to identify the one or more objects.

5. The method of claim 1, wherein the second extraction operation to identify one or more image areas based on modeled thermal feature training includes comparison of received image data to thermal model references learned by the module, wherein each thermal reference relates to one or more of a modeled representation of an object, object portion and thermal characteristic.

6. The method of claim 1, wherein identifying one or more objects in the image data includes modifying regions identified by the feature extraction operation based on determinations of the second extraction operation, and tracking one or more features in the image data based on the modified regions.

7. The method of claim 1, wherein identifying one or more objects includes detecting artifacts in the image data associated with thermal characteristics in the image data.

8. The method of claim 1, wherein identifying includes conversion of received image data to a binary gradient for performing at least one of the feature extraction and second feature extraction.

9. The method of claim 1, wherein outputting includes generating one or more of bounding regions and icon elements associated with identified objects detected in the image data.

10. The method of claim 1, further comprising receiving thermal characteristic models for a plurality of object types and utilizing the thermal characterize models for the second parameter extraction parameters, wherein the thermal characteristic models provide one or more search targets for identification of objects in image data.

11. A vehicle driver assist module comprising:
    an optical image sensor to detect optical image data; and
    an object detection module coupled to the optical image sensor, the object detection module including a processor configured to
        receive optical image data detected by the optical image sensor;
        detect at least one object in the image data, wherein detecting the at least one object includes
            performing a feature extraction operation on the optical image data detected by the image sensor to identify one or more image areas,
            performing a second extraction operation on the optical image data detected by the optical image sensor to identify one or more image areas based on modeled thermal feature training, and
            identify one or more objects in the optical image data based on a comparison of one or more image areas of the feature extraction operation and second extraction operation; and
        output the optical image data detected by the image sensor including one or more graphical elements as a notification for the at least one object.

12. The device of claim 11, wherein image data received by the module is captured by an optical image sensor configured to output color model based representation of video image data.

13. The device of claim 11, wherein detecting at least one object includes detection of one or more of a person, pedestrian, vehicle, roadway, lane marker, hazard and objects in front of the vehicle.

14. The device of claim 11, wherein the feature extraction operation includes processing received image data based on one or more of image enhancement, edge detection, filtering and region analysis to identify the one or more objects.

15. The device of claim 11, wherein the second extraction operation to identify one or more image areas based on modeled thermal feature training includes comparison of received image data to thermal model references learned by the module, wherein each thermal reference relates to one or more of a modeled representation of an object, object portion and thermal characteristic.

16. The device of claim 11, wherein identifying one or more objects in the image data includes modifying regions identified by the feature extraction operation based on determinations of the second extraction operation, and tracking one or more features in the image data based on the modified regions.

17. The device of claim 11, wherein identifying one or more objects includes detecting artifacts in the image data associated with thermal characteristics in the image data.

18. The device of claim 11, wherein identifying includes conversion of received image data to a binary gradient for performing at least one of the feature extraction and second feature extraction.

19. The device of claim 11, wherein outputting includes generating one or more of bounding regions and icon elements associated with identified objects detected in the image data.

20. The device of claim 11, further comprising receiving thermal characteristic models for a plurality of object types and utilizing the thermal characterize models for the second parameter extraction parameters, wherein the thermal characteristic models provide one or more search targets for identification of objects in image data.

* * * * *